United States Patent
Jeon et al.

(10) Patent No.: US 12,409,692 B2
(45) Date of Patent: Sep. 9, 2025

(54) CORNER MODULE APPARATUS FOR VEHICLE

(71) Applicant: HYUNDAI MOBIS CO., LTD., Seoul (KR)

(72) Inventors: Jae Woong Jeon, Yongin-si (KR); Jin Wook Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 405 days.

(21) Appl. No.: 18/080,974

(22) Filed: Dec. 14, 2022

(65) Prior Publication Data

US 2023/0302860 A1 Sep. 28, 2023

(30) Foreign Application Priority Data

Feb. 3, 2022 (KR) .......................... 10-2022-0014080
May 18, 2022 (KR) .......................... 10-2022-0060770

(51) Int. Cl.
*B60G 3/26* (2006.01)
*B60K 7/00* (2006.01)

(52) U.S. Cl.
CPC ............ *B60G 3/265* (2013.01); *B60K 7/0007* (2013.01); *B60G 2200/144* (2013.01); *B60G 2300/50* (2013.01)

(58) Field of Classification Search
CPC .. B60K 1/04; B60K 2001/048; B62D 21/157; B62D 25/2036; B62D 7/18; B60B 27/0047
USPC .............................. 180/68.5; 280/70, 93.512
See application file for complete search history.

(56) References Cited

U.S. PATENT DOCUMENTS

| 3,917,308 A | 11/1975 | Schulz | |
| 6,354,616 B1 * | 3/2002 | Morin | A61G 21/00 |
| | | | 280/124.147 |
| 6,561,307 B1 * | 5/2003 | Brill | B62D 5/0418 |
| | | | 180/443 |

(Continued)

FOREIGN PATENT DOCUMENTS

| DE | 102015209595 A1 * | 12/2016 | ............... B60G 3/20 |
| DE | 102017106810 A1 * | 10/2018 | ........... B60G 15/068 |

(Continued)

OTHER PUBLICATIONS

Partial European search report issued on Jun. 26, 2023, in counterpart European Patent Application No. 22214408.1 (11 pages in English).

(Continued)

*Primary Examiner* — James A Shriver, II
*Assistant Examiner* — Hilary L Johns
(74) *Attorney, Agent, or Firm* — NSIP Law

(57) ABSTRACT

A corner module apparatus for a vehicle including a driving unit installed inside a wheel and configured to provide a driving force to the wheel, a first knuckle coupled to the driving unit, a second knuckle spaced apart from the first knuckle in a width direction of the vehicle and disposed to face each other, a suspension unit configured to connect to the second knuckle and supports the second knuckle for a vehicle body, a steering driving unit installed in the second knuckle configured to generate a steering force, and a steering angle adjustment unit connected to the first knuckle and configured to adjust a steering angle of the wheel in conjunction with the steering force generated from the steering driving unit.

17 Claims, 15 Drawing Sheets

(56) References Cited

U.S. PATENT DOCUMENTS

| | | | | |
|---|---|---|---|---|
| 8,157,036 | B2* | 4/2012 | Yogo | B60G 13/16 |
| | | | | 180/300 |
| 9,731,572 | B2* | 8/2017 | Tamura | B60G 15/062 |
| 10,919,575 | B1* | 2/2021 | Sardes | B62D 25/20 |
| 11,267,522 | B2* | 3/2022 | Sardes | B60K 7/0007 |
| 11,745,793 | B2* | 9/2023 | Hallundbæk | B60K 7/0007 |
| | | | | 180/408 |
| 11,814,115 | B2* | 11/2023 | Hallundbæk | B62D 31/02 |
| 12,017,499 | B2* | 6/2024 | Joo | B60G 3/20 |
| 2006/0048978 | A1* | 3/2006 | Nagaya | B62D 7/18 |
| | | | | 180/6.48 |
| 2014/0353054 | A1* | 12/2014 | Matayoshi | B62D 5/0421 |
| | | | | 180/55 |
| 2015/0083508 | A1* | 3/2015 | Bluethmann | B62D 5/0418 |
| | | | | 180/204 |
| 2018/0345777 | A1* | 12/2018 | Birnschein | B60W 10/08 |
| 2018/0345971 | A1* | 12/2018 | Birnschein | B62D 21/152 |
| 2019/0144034 | A1* | 5/2019 | Bertassi | B62D 7/18 |
| | | | | 280/93.512 |
| 2020/0122771 | A1* | 4/2020 | Ooba | B60G 3/20 |
| 2020/0239064 | A1* | 7/2020 | Hallundbæk | B62D 5/06 |
| 2021/0197897 | A1* | 7/2021 | Sardes | B62D 25/08 |
| 2021/0284262 | A1* | 9/2021 | Sardes | B60W 10/08 |
| 2022/0161878 | A1* | 5/2022 | Sardes | B60K 23/00 |

FOREIGN PATENT DOCUMENTS

| | | | | |
|---|---|---|---|---|
| EP | 0 255 921 A2 | | 2/1988 | |
| EP | 3 689 712 A1 | | 8/2020 | |
| FR | 2 231 555 A1 | | 12/1974 | |
| FR | 2 723 887 A1 | | 3/1996 | |
| GB | 2582330 A | | 9/2020 | |
| JP | 2008168803 A | * | 7/2008 | |
| WO | WO-2004030971 A1 | * | 4/2004 | B60G 3/01 |
| WO | WO-2004067358 A1 | * | 8/2004 | B60G 3/14 |
| WO | WO-2013073308 A1 | * | 5/2013 | B60G 13/005 |
| WO | WO-2018177642 A1 | * | 10/2018 | B60G 15/068 |
| WO | WO-2018235894 A1 | * | 12/2018 | B60G 3/20 |
| WO | WO-2021137194 A1 | * | 7/2021 | B60K 17/356 |

OTHER PUBLICATIONS

Extended European search report issued on May 10, 2023, in counterpart European Patent Application No. 22214408.1 (12 pages).

* cited by examiner

CORNER MODULE APPARATUS FOR VEHICLE

CROSS-REFERENCE TO RELATED APPLICATION

This application claims the benefit under 35 USC § 119 (a) of Korean Patent Application No. 10-2022-0014080, filed on Feb. 3, 2022, and Application No. 10-2022-0060770, filed on May 18, 2022, the entire disclosures of which are hereby incorporated by reference for all purposes as if set forth herein.

FIELD

Exemplary embodiments of the present disclosure relate to a corner module apparatus for a vehicle, and more particularly, in which a driving, a braking, a steering, and a suspension system are integrated.

DESCRIPTION OF THE RELATED ART

In general, an electric vehicle is an eco-friendly vehicle that does not emit exhaust gas, and is equipped with a high voltage battery that supplies energy for driving, a driving motor that generates rotational force from power output from the high voltage battery, and a rotational power of a motor is transmitted to a wheel through a drive shaft.

In recent years, in-wheel motor vehicles have been in the spotlight, which reduce weight of a vehicle by omitting intermediate power transmission devices such as decelerators and differential gears, and consider an advantage of reducing energy loss in a power transmission process, and power of a motor is transmitted directly to a wheel because the motor is directly installed inside the wheel. Furthermore, not only a driving system but also a braking, a steering, and a suspension system are being actively developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a corner module apparatus for a vehicle including a driving unit installed inside a wheel, the driving unit being configured to provide a driving force to the wheel, a first knuckle coupled to the driving unit, a second knuckle spaced apart from the first knuckle in a width direction of the vehicle and disposed to face each other, a suspension unit configured to connect to the second knuckle and to support the second knuckle for a vehicle body, a steering driving unit installed in the second knuckle configured to generate a steering force, and a steering angle adjustment unit connected to the first knuckle, the steering angle adjustment unit being configured to adjust a steering angle of the wheel in conjunction with the steering force generated from the steering driving unit.

The second knuckle may include a knuckle body disposed to face the first knuckle and provided with an accommodation unit into which the steering driving unit is inserted, a mounting unit which extends from a first side of the knuckle body, the mounting unit being configured to support the steering angle adjustment unit, a first connection unit extending from the mounting unit and connected to the suspension unit, and a second connection unit extending from a second side of the knuckle body and connected to the suspension unit.

The knuckle body may be disposed to be inclined with respect to a ground.

The accommodation unit may penetrate the knuckle body in a width direction of the vehicle.

The first connection unit and the second connection unit may be disposed to be spaced apart from each other in a direction perpendicular to a ground.

The steering angle adjustment unit may include a deceleration unit configured to connect with the second knuckle and to slow down the steering force generated from the steering driving unit and a joint unit configured to vary the steering angle of the wheel by transmitting the steering force from the deceleration unit to the first knuckle.

The deceleration unit may include a first transmission gear configured to rotate with an input shaft of the steering driving unit, a second transmission gear that is configured to engage with the first transmission gear and to rotate in conjunction with a rotation of the first transmission gear, and a third transmission gear configured to engage with the second transmission gear and to rotate an output shaft in conjunction with a rotation of the second transmission gear.

The first transmission gear may include a shape of a worm shaft and worm threads provided on an outer peripheral surface of the first transmission gear.

The joint unit includes a first joint extending from the output shaft and connected to a first side of the first knuckle and a second joint extending from the second knuckle, spaced apart from the first joint, and connected to a second side of the first knuckle.

The first joint and the second joint may be disposed to be inclined at a predetermined angle with respect to a ground.

The first joint and the second joint may be constant velocity joints.

The suspension unit may include a suspension arm provided between the second knuckle and the vehicle body and being configured to support the second knuckle and a shock absorber connected to the suspension arm, the shock absorber configured to absorb an impact transmitted from a road surface.

The suspension arm may include a first arm may include a first end rotatably connected to the first connection unit and a second end rotatably connected to the vehicle body and a second arm, the second arm being spaced apart from the first arm, the second arm may include a third end rotatably connected to the second connection unit and a fourth rotatably connected to the vehicle body.

In another general aspect, here is provided a corner module apparatus for a vehicle including a driving unit installed inside a wheel, the driving unit being configured to provide a driving force to the wheel, a first knuckle coupled to the driving unit, a second knuckle spaced away from the first knuckle to face the first knuckle in a width direction of the vehicle and being configured to rotatably support the first knuckle, a suspension arm configured to connect the second knuckle and a vehicle body and configured to support the second knuckle with respect to the vehicle body, a joint arm configured to connect the first knuckle and the second knuckle to each other, and an angle adjustment unit provided between the second knuckle and the joint arm and configured to adjust a relative angle between the first knuckle and the second knuckle by axially rotating the joint arm in the width direction of the vehicle.

The joint arm may include a ball joint rotatably jointed to the first knuckle, a fastener fastened to the second knuckle, and a connection member configured to connect, the connection member being provided between the ball joint and the fastener.

A first fastening hole may be defined in the joint arm, the first fastening hole passing through an outer surface of the fastener and a first slot hole may also be defined in the joint arm, the first slot hole being positioned under the first fastening hole and passing through the outer surface of the fastener.

A second fastening hole may be defined in the second knuckle, the second fastening hole corresponding to the first fastening hole and a second slot hole may be defined in the second knuckle, the second slot hole corresponding to the first slot hole.

The first slot hole and the second slot hole may be formed in a shape of a longitudinal hole in the width direction of the vehicle.

The angle adjustment unit may include a cam bolt, a washer being eccentrically coupled to an outer circumferential surface of a bolt shaft of the cam bolt, wherein the first slot hole and the second slot hole pass through the bolt shaft and a guide unit formed on an outer surface of the second knuckle, the guide unit being configured to guide the washer in such a manner as to eccentrically rotate the cam bolt.

The angle adjustment unit may also include an adjustment member passing through the first fastening hole and the second fastening hole, the adjustment member being configured to fasten the second knuckle and the fastener to each other.

Figure 1:
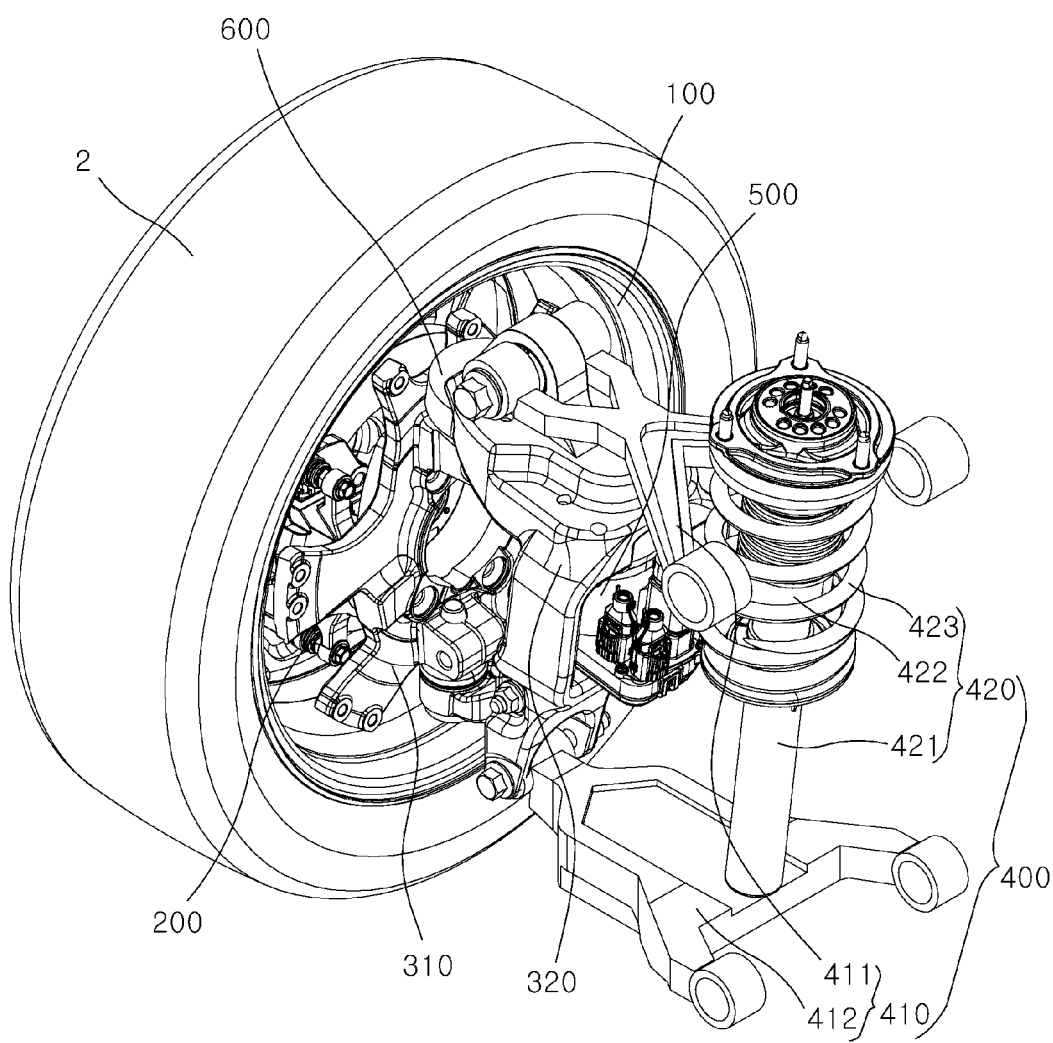
FIG. 1 is a perspective view schematically illustrating a configuration of a corner module apparatus for a vehicle according to a first embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
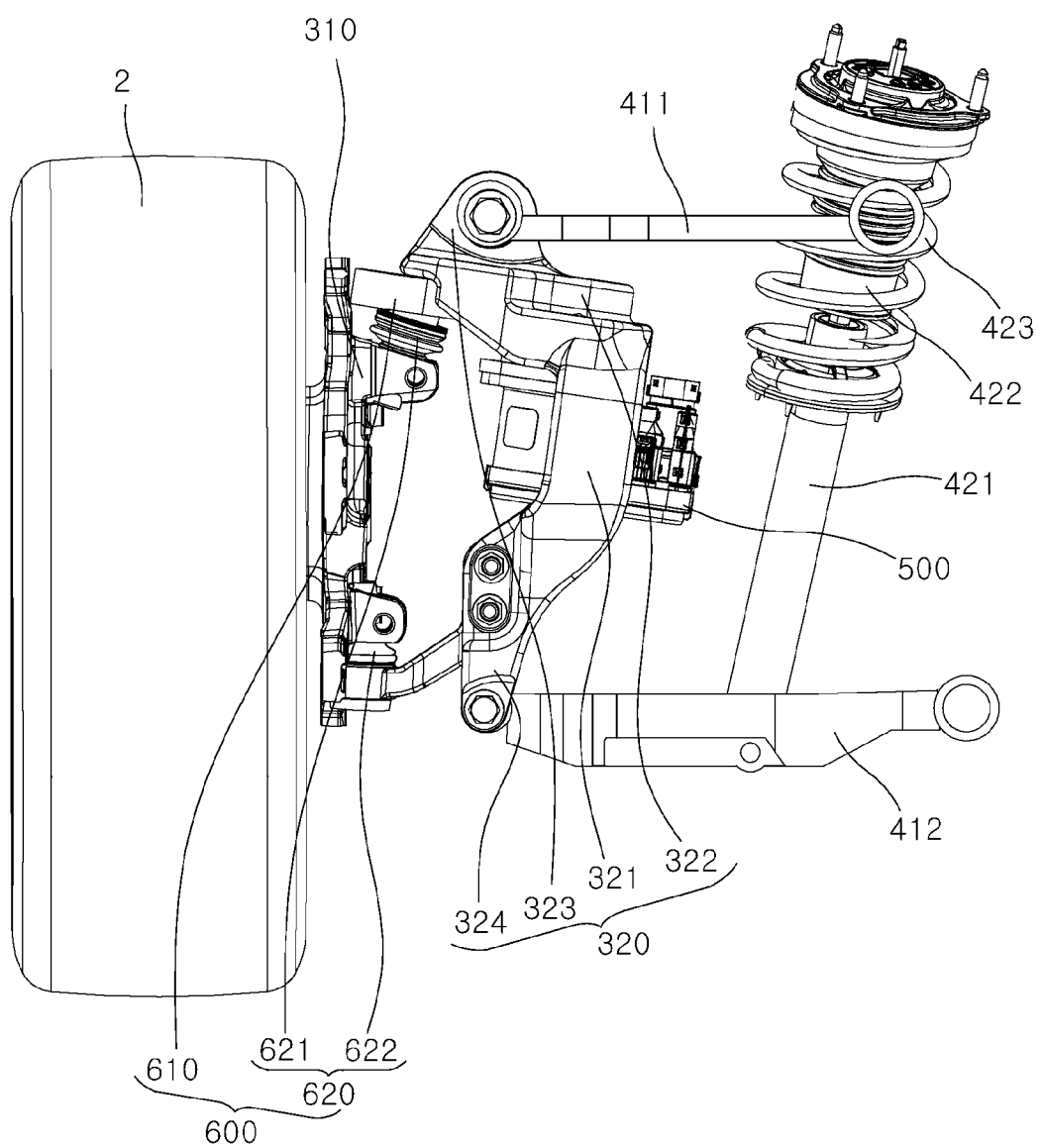
FIG. 2 is a side view schematically illustrating the configuration of the corner module apparatus for a vehicle according to the first embodiment of the present disclosure.
Figure 3:
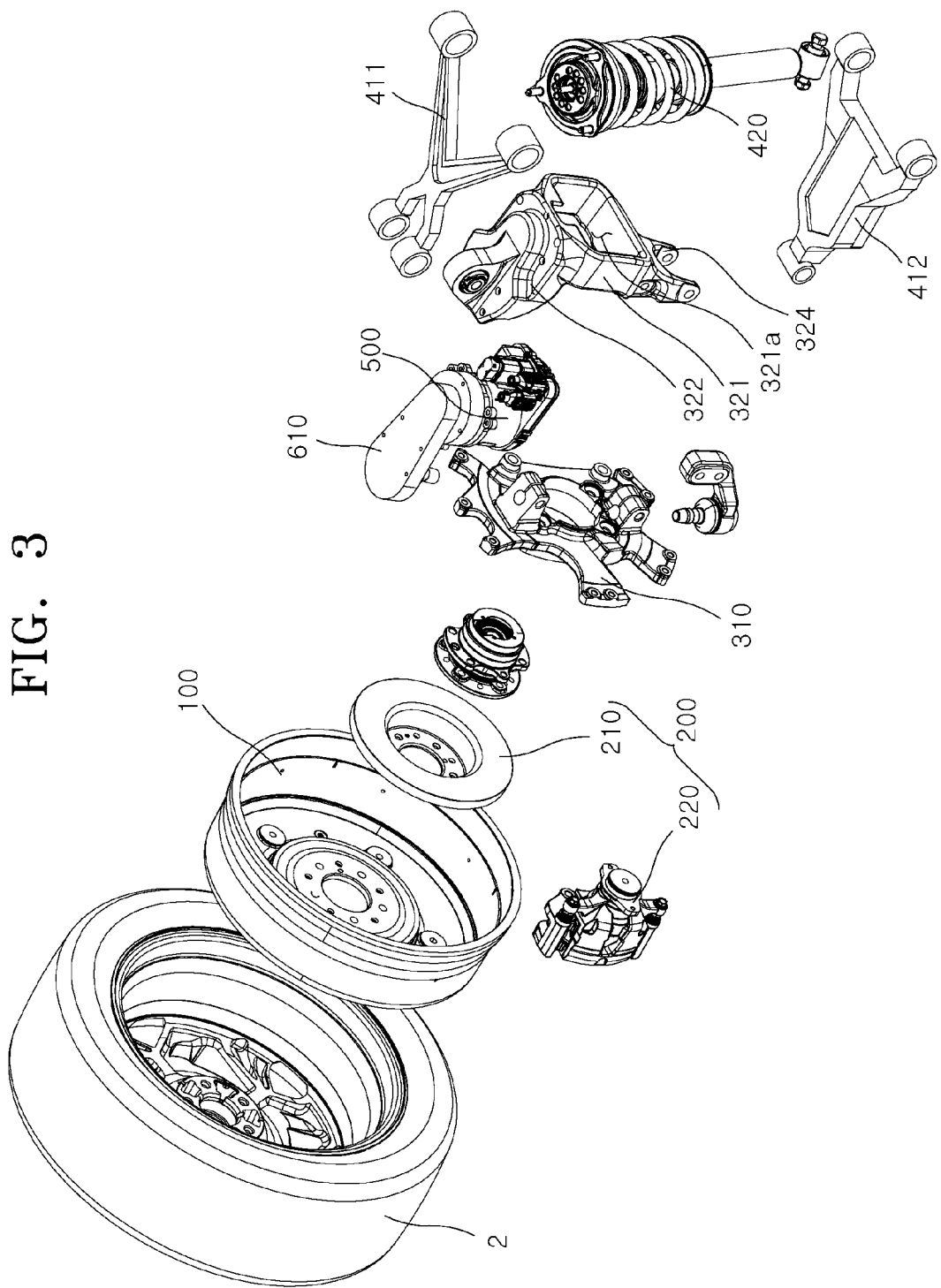
FIG. 3 is an exploded perspective view schematically illustrating the configuration of the corner module apparatus for a vehicle according to the first embodiment of the present disclosure.

FIG. 1 is a perspective view schematically illustrating a configuration of a corner module apparatus for a vehicle according to first embodiment of the present disclosure, FIG. 2 is a side view schematically illustrating the configuration of the corner module apparatus for a vehicle according to first embodiment of the present disclosure, and FIG. 3 is an exploded perspective view schematically illustrating the configuration of the corner module apparatus for a vehicle according to first embodiment of the present disclosure.

Referring to FIGS. 1 and 2, a corner module apparatus for a vehicle 1 according to the present disclosure includes a driving unit 100, a braking unit 200, a first knuckle 310, the second knuckle 320, a suspension unit 400, a steering driving unit 500, and a steering angle adjustment unit 600.

The driving unit 100 is installed inside a wheel 2 of a vehicle and rotates the wheel 2 by providing a driving force to the wheel 2. The driving unit 100 is installed on each of the wheels 2 of the vehicle to individually provide driving force to a plurality of wheels 2. The driving unit 100 according to the present disclosure may include a stator fixed inside the wheel 2, which forms a magnetic field by receiving power from a vehicle battery, and a rotor installed to be rotated inside the wheel 2, and rotating the wheel 2 by electromagnetic interaction with the stator. A central axis of the stator and the rotor may be positioned on the same line as a central axis of the wheel 2, and may be disposed to be concentrically stacked inside the wheel 2.

The braking unit 200 is installed inside the wheel 2 and interferes with a rotation of the wheel 2 to apply or release the braking force.

The braking unit 200 according to the present disclosure includes a brake disk 210 and a brake caliper 220.

The brake disk 210 is connected to the wheel 2 or the driving unit 100 and rotates in conjunction with rotation of the wheel 2. The brake disk 210 according to the present disclosure is formed to have the shape of a disk and is installed inside the wheel 2. The brake disk 210 is disposed such that a central axis thereof is aligned with the central axis of the wheel 2. The brake disk 210 may be integrally connected to the rotor of the driving unit 100 or the wheel 2 by bolting or the like. Accordingly, the brake disk 210 may be rotated about the central axis together with the wheel 2 when the wheel 2 is rotated. A diameter of the brake disk 210 may be variously changed in design according to a diameter of the wheel 2 and a size of the driving unit 100.

The brake caliper 220 applies a braking force by pressing the brake disk 210 when braking the vehicle. The brake caliper 220 according to of the present disclosure may include a brake pad disposed and facing the brake disk 210, a caliper housing coupled to the first knuckle 310 to be described later, a caliper housing for supporting the brake pad movably, and a piston which is installed to move forward and backward in the caliper housing and presses or releases the brake pad toward the brake disk 210 according to the moving direction.

The first knuckle 310 is combined with the driving unit 100 and functions as a configuration to form a kingpin shaft, which is a central axis of steering, by providing a mechanical connection to a wheel 2 of a steering angle adjustment unit 600 described later. The first knuckle 310 according to the present disclosure may be bonded and supported by a stator of the driving unit 100 by bolting or the like. The first knuckle 310 may rotatably support the rotor of the driving unit 100 through a wheel bearing or the like. The first knuckle 310 may be manufactured by molding a metal-based material with a casting or the like to ensure sufficient rigidity. The specific shape of the first knuckle 310 is not limited to the shape illustrated in FIGS. 1 and 2, and is combined with the driving unit 100 to make various changes in design within a technical idea of a shape that may be disposed to face an inner surface of the wheel 2.

A second knuckle 320 is spaced apart from the first knuckle 310 and supports the steering driving unit 500 and the steering angle adjustment unit 600, which will be described later, while providing a mechanical connection to a body of a suspension unit 400. For this reason, the second knuckle 320 functions as a configuration for forming a suspension shaft that moves up and down when the wheel 2 bumps and rebounds. The second knuckle 320 is disposed to face the first knuckle 310 at a predetermined interval in a width direction of the vehicle. Accordingly, the first knuckle 310 and the second knuckle 320 dispose the kingpin shaft to a position close to the wheel 2 by separating the suspension shaft formed in the second knuckle 320 and the kingpin shaft formed in the first knuckle 310 each other in the width direction of the vehicle, thereby reducing an offset value of the kingpin and improving the driving and braking stability of the vehicle.

Figure 4:
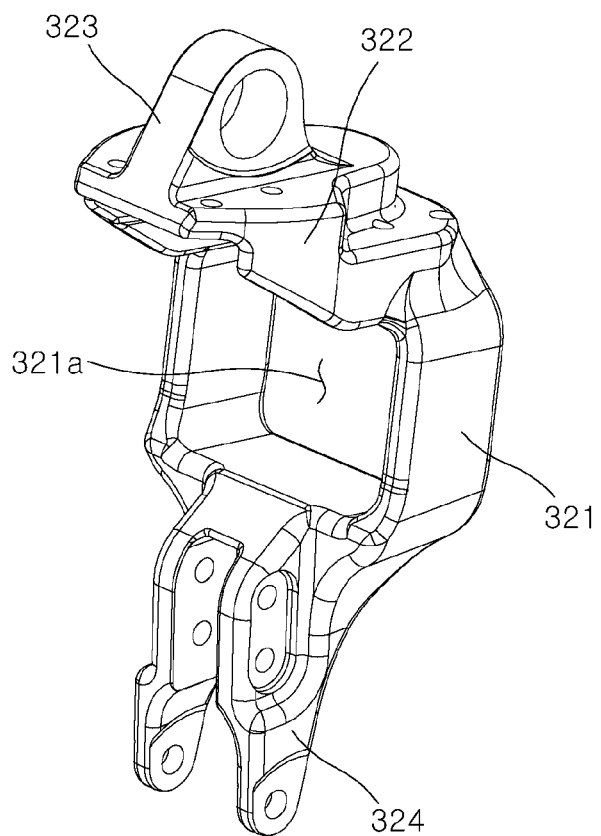
FIG. 4 is a perspective view schematically illustrating a configuration of a second knuckle unit according to the first embodiment of the present disclosure.

FIG. 4 is a perspective view schematically illustrating a configuration of a second knuckle according to first embodiment of the present disclosure.

Referring to FIG. 4, the second knuckle 320 according to the present disclosure includes a knuckle body 321, a mounting unit 322, a first connection unit 323, and a second connection unit 324.

The knuckle body 321 forms a central appearance of the second knuckle 320 and entirely supports the mounting unit 322, the first connection unit 323, and the second connection unit 324. The knuckle body 321 according to the present disclosure may be provided with a hole-shaped accommodation unit 321*a* penetrating the knuckle body 321 in the width direction of the vehicle. Accordingly, the knuckle body 321 may be formed to have substantially the shape of a hollow square frame. The steering driving unit 500 is inserted into the accommodation unit 321*a*, and the knuckle body 321 is combined with the steering driving unit 500 inserted into the accommodation unit 321*a* by welding and bolting to support the steering driving unit 500. The knuckle body 321 may be disposed to be inclined at a predetermined angle with respect to the ground such that an output shaft 614 of the steering angle adjustment unit 600 is disposed parallel to the kingpin shaft.

The mounting unit 322 extends from one side of the knuckle body 321 to form an appearance of one side of the second knuckle 320. The mounting unit 322 is combined with the steering angle adjustment unit 600 to support the steering angle adjustment unit 600. The mounting unit 322 according to the present disclosure extends from an upper end of the knuckle body 321 toward the wheel 2. A lower side surface of the mounting unit 322 is formed so that an upper side surface of a deceleration unit 610 in the steering angle adjustment unit 600 may be seated. In a state in which the upper side surface of the deceleration unit 610 is seated on the lower side surface of the mounting unit 322, as the mounting unit 322 is integrally coupled with the deceleration unit 610, the mounting unit 322 supports the steering angle adjustment unit 600 by bolting coupling or the like.

The first connection unit 323 extends from the mounting unit 322 and is connected to a first arm 411 provided in a suspension unit 400. The first connection unit 323 according to the present disclosure may be formed to have the shape of a ring protruding upward from an upper side surface of the mounting unit 322. The first connection unit 323 may be connected to one end of the first arm 411 provided in the suspension unit 400 through a bush, a ball joint, a pin, or the like. The first connection unit 323 rotatably supports one end of the first arm 411 to function as an upper reference point of a suspension shaft that moves up and down when the wheel 2 bumps and rebounds.

The second connection unit 324 extends from the other side of the knuckle body 321 to form the other side appearance of the second knuckle 320. The second connection unit 324 is connected to a second arm 412 provided in the suspension unit 400. The second connection unit 324 according to the present disclosure may be formed to have the shape of a pair of bars extending downward from the lower end of the knuckle body 321. The second connection unit 324 may be connected to one end of the second arm 412 provided in the suspension unit 400 through a bush, a ball joint, a pin, or the like. The second connection unit 324 rotatably supports one end of the second arm 412 to function as a lower reference point of the suspension shaft that moves up and down when the wheel 2 bumps and rebounds.

The first connection unit 323 and the second connection unit 324 are disposed to be spaced apart from each other in a direction perpendicular to the ground. Accordingly, the first connection unit 323 and the second connection unit 324 may arrange the direction of the suspension shaft in parallel with the direction of movement of the bump and rebound of the wheel 2.

The suspension unit 400 is connected to the second knuckle 320 and supports the second knuckle 320 with respect to the vehicle body. The suspension unit 400 is provided to absorb an impact transmitted from a road surface through the wheel 2 when the vehicle travels. Herein, the vehicle body may be exemplified as a chassis frame such as a sub frame (not illustrated) installed below the vehicle.

The suspension unit 400 according to the present disclosure includes a suspension arm 410 and a shock absorber 420.

The suspension arm 410 is provided between the second knuckle 320 and a vehicle body to support the second knuckle 320. More specifically, the suspension arm 410 connects the wheel 2 to the vehicle body through the second knuckle 320, absorbs a load applied from the wheel 2 during driving the vehicle by its own rigidity, and controls the movement of the wheel 2.

The suspension arm 410 according to the present disclosure may include a first arm 411 and a second arm 412.

The first arm 411 and the second arm 412 are disposed to face each other while being spaced apart in the vertical direction. One end of the first arm 411 is rotatably connected to the first connection unit 323 and the other end thereof is rotatably connected to the vehicle body. The second arm 412 is rotatably connected to the second connection unit 324, and the other end thereof is rotatably connected to the vehicle body. In this case, both ends of the first arm 411 and the second arm 412 may be rotatably supported on the first connection unit 323 and the vehicle body, respectively, or the second connection unit 324 and the vehicle body, respectively, through a bush, a ball joint, a pin, or the like. The first arm 411 and the second arm 412 may be formed to have the shape of a double wishbone. Accordingly, the first arm 411 and the second arm 412 may be able to set the negative camber of the wheel 2, thereby improving the cornering performance of the vehicle and enabling low-phase setting to lower a height.

The shock absorber 420 is connected to the suspension arm 410 and is provided extensively along the longitudinal direction to absorb impact or vibration transmitted from a road surface to the vehicle body through the wheel 2. The shock absorber 420 according to the present disclosure includes a cylinder 421, a rod 422, and an elastic body 423.

The cylinder 421 extends in the vertical direction and is filled with fluid therein. A lower end portion of the cylinder 421 may pass through the first arm 411 and may be rotatably connected to an upper side surface of the second arm 412.

The rod 422 extends in the longitudinal direction of the cylinder 421. The rod 422 is installed to be slidably moved along the longitudinal direction of the cylinder 421 by inserting a lower side thereof into an upper end of the cylinder 421. The other side of the rod 422 is coupled to a wheel mount (not shown) by bolting or the like. The rod 422 moves to be slid along the longitudinal direction of the cylinder 421 when the wheel 2 bumps and rebounds.

The elastic body 423 is disposed to surround outer surfaces of the cylinder 421 and the rod 422, and a length thereof is variable in conjunction with a slide movement of the rod 422. The elastic body 423 according to the present disclosure may be formed to have the shape of a coil spring which is elastic in the longitudinal direction. Both ends of the elastic body 423 may be supported by being coupled to a lower sheet fixed to the cylinder 421 and an upper sheet fixed to the rod 422, respectively. The elastic body 423 is compressed or stretched when the rod 422 slides, accumulates elastic restoring force, and may offset an impact applied from the road surface by an accumulated elastic restoring force.

The steering driving unit 500 is installed in the second knuckle 320 and then generates a steering force.

Figure 5:
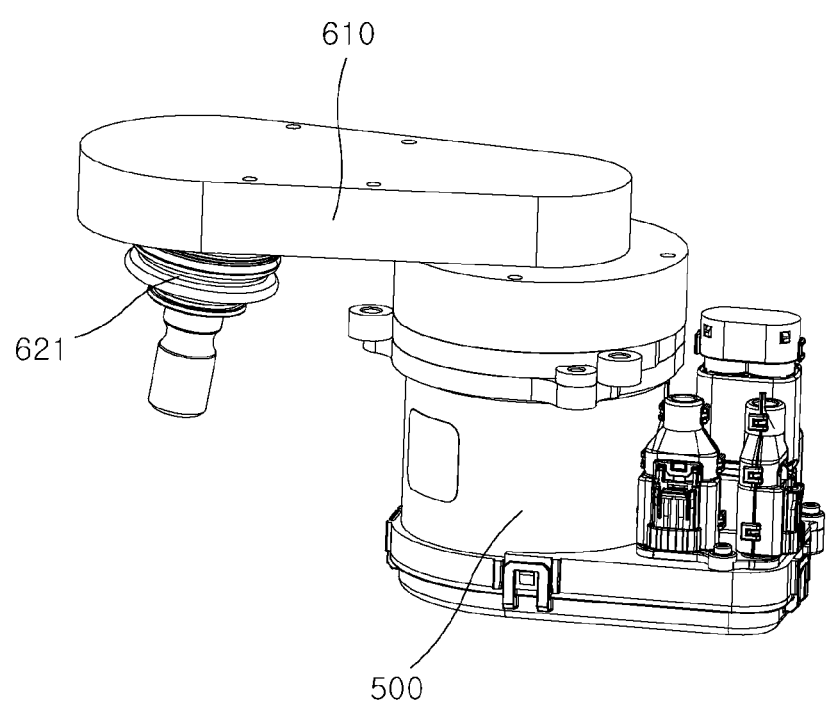
FIG. 5 is a perspective view schematically illustrating a configuration of a steering driving unit and a steering angle adjustment unit according to the first embodiment of the present disclosure.
Figure 6:
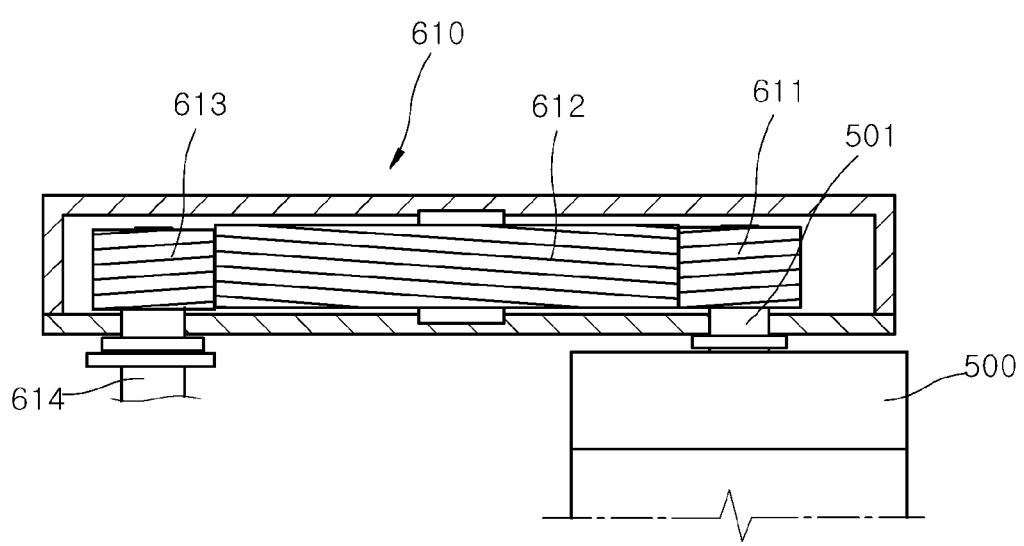
FIG. 6 is a cross-sectional view schematically illustrating the configuration of the steering drive unit and the steering angle adjustment unit according to the first embodiment of the present disclosure.

FIG. 5 is a perspective view schematically illustrating a configuration of a steering driving unit and a steering angle adjustment unit according to first embodiment of the present disclosure, and FIG. 6 is a cross-sectional view schematically illustrating the configuration of the steering drive unit and the steering angle adjustment unit according to first embodiment of the present disclosure.

Referring to FIGS. 1 to 6, the steering driving unit 500 according to the present disclosure may be exemplified as various types of electric motors that generate rotational force from a power source applied from the outside. The steering driving unit 500 is inserted into an accommodation unit 321a and is integrally coupled and supported with the knuckle body 321 by welding or bolting. The steering driving unit 500 may be connected to a battery of a vehicle to receive power from the battery. The steering driving unit 500 is connected to an ECU of the vehicle or the like, and whether a rotational force is generated and a direction of the rotational force or the like may be controlled by a control signal of the ECU.

The steering driving unit 500 is equipped with an input shaft 501 that transmits the rotational force generated by the steering driving unit 500 to a steering angle adjustment unit 600, which will be described later. The input shaft 501 according to the present disclosure is formed to have the shape of an approximate bar and protrudes from an upper end of the steering driving unit 500 toward the mounting unit 322.

The steering angle adjustment unit 600 is connected to the first knuckle 310 and adjusts the steering angle of the wheel 2 in conjunction with a steering force generated by the steering driving unit 500.

The steering angle adjustment unit 600 according to the present disclosure includes a deceleration unit 610 and a joint unit 620.

The deceleration unit 610 is coupled to and supported by the second knuckle 320. More specifically, an upper side of the deceleration unit 610 is seated on a lower side of the mounting unit 322, and the deceleration unit 610 is integrally coupled and supported with the mounting unit 322 by bolting coupling or the like. The deceleration unit 610 decelerates and outputs a steering force generated from the steering driving unit 500. That is, the deceleration unit 610 is provided to amplify a magnitude of the steering force transmitted to the wheel 2 by decelerating a rotation speed of the input shaft 501 rotated in conjunction with operation of the steering driving unit 500 to a set deceleration ratio.

The deceleration unit 610 according to the present disclosure includes a first transmission gear 611, a second transmission gear 612, and a third transmission gear 613.

The first transmission gear 611 is rotated together with the input shaft 501 of the steering driving unit 500. The first transmission gear 611 according to the present disclosure may be formed to have the shape of a worm shaft equipped with worm threads on the outer peripheral surface. Accordingly, when the first transmission gear 611 engages with the second transmission gear 612, it can be prevented from being reversed by the rotational force transmitted from the second transmission gear 612, thereby preventing the steering angle of the wheel 2 from being arbitrarily changed. The worm thread formed on the outer peripheral surface of the first transmission gear 611 may vary in a pitch diameter along an axial direction of the first transmission gear 611. As illustrated in FIG. 6, the first transmission gear 611 may be disposed parallel to the input shaft 501 as the input shaft 501 is inserted directly through the central axis of the steering driving unit 500, and may be disposed perpendicular to the input shaft 501 through a separate gear connection structure.

The second transmission gear 612 is engaged with the first transmission gear 611 for being combined therewith and rotated in conjunction with a rotation of the first transmission gear 611. In the second transmission gear 612 according to the present disclosure, a direction of the central axis is arranged parallel to the input shaft 501. As illustrated in FIG. 6, the second transmission gear 612 may be formed to have the shape of a spiral tooth that is conjugated to the worm thread formed in the first transmission gear 611 on the outer peripheral surface. A tooth shape formed on the outer peripheral surface of the second transmission gear 612 may vary in a pitch diameter along an axial direction of the second transmission gear 612.

In contrast, when the first transmission gear 611 is disposed perpendicular to the input shaft 501, the second transmission gear 612 may be formed to have a conventional worm wheel shape in which the central axis is disposed parallel to the input shaft 501 and engaged with the worm thread of the first transmission gear 611.

The third transmission gear 613 is engaged with the second transmission gear 612 for being combined therewith and rotates an output shaft 614 in conjunction with a rotation of the second transmission gear 612. In the third transmission gear 613 according to the present disclosure, a direction of the central axis is arranged parallel to the input shaft 501, and the output shaft 614 is inserted directly through the central axis. Accordingly, the central axis of the output shaft 614 is disposed parallel to the input shaft 501 and may be integrally rotated with the third transmission gear 613. As illustrated in FIG. 6, the output shaft 614 may be formed on the outer peripheral surface of the third transmission gear 613 to have the shape of a spiral tooth that is conjugated to the tooth shape formed in the second transmission gear 612. A pitch diameter of the tooth shape formed on the outer peripheral surface of the third transmission gear 613 may vary along the axial direction of the third transmission gear 613.

In contrast, the third transmission gear 613 may be formed to have a typical helical gear, spur gear, or the like that is engaged with the outer peripheral surface of the second transmission gear 612 when the second transmission gear 612 is formed in the shape of a worm wheel.

A joint unit 620 provides a mechanical connection of the second knuckle 320 and the first knuckle 310, and at the same time finally transmits the steering force output from the delivery unit 510 to the first knuckle 310 to change the steering angle of the wheel 2.

The joint unit 620 according to the present disclosure includes a first joint 621 and a second joint 622.

The first joint 621 extends from the output shaft 614 and is connected to one side of the first knuckle 310. The first joint 621 finally transmits the steering force generated from the steering driving unit 500 to the first knuckle 310. In this case, the first joint 621 functions as an upper reference point of the kingpin shaft, which is a central axis on which the wheel 2 rotates during a steering operation of the wheel 2.

Figure 7:
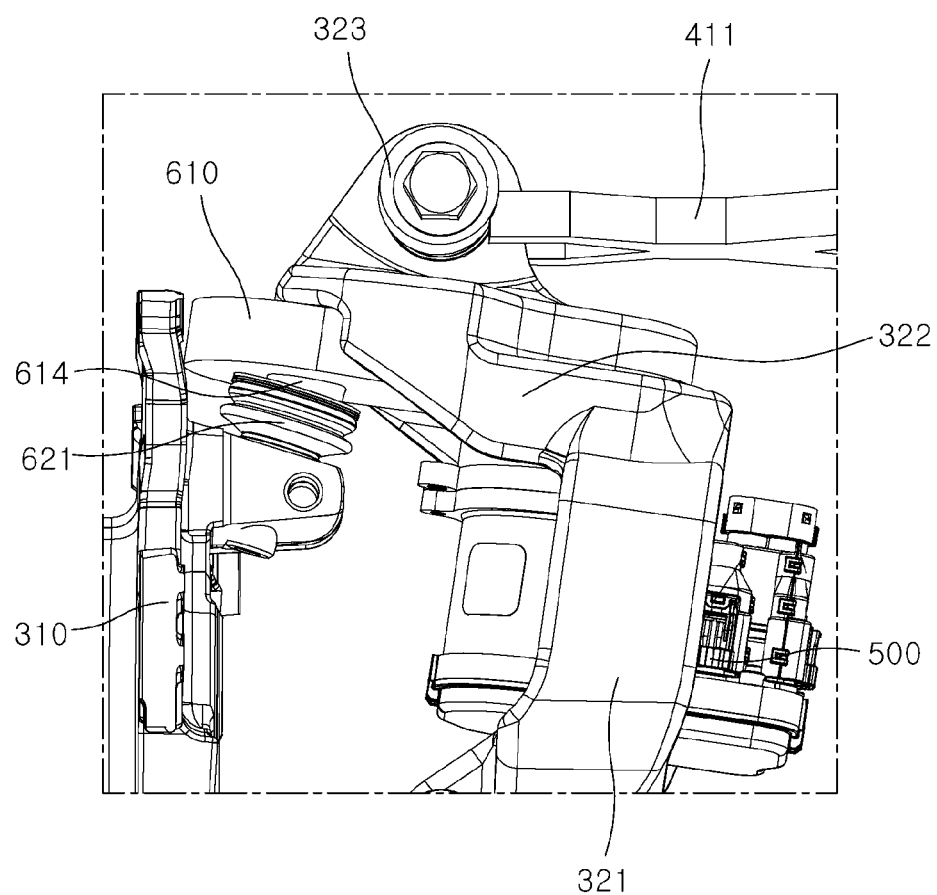
FIG. 7 is an enlarged view schematically illustrating a configuration of a first joint according to the first embodiment of the present disclosure.

FIG. 7 is an enlarged view schematically illustrating a configuration of a first joint according to first embodiment of the present disclosure.

Referring to FIGS. 1 to 7, both sides of the first joint 621 according to the present disclosure are connected to the lower end of the output shaft 614 and the upper side of the first knuckle 310. The first joint 621 partially allows cutting of the output shaft 614 and the first knuckle 310 according to the vertical behavior of the wheel 2, at the same time, the first joint 621 may be exemplified as various types of constant speed joints so that the output shaft 614 and the first knuckle 310 may be rotated at the same angular speed.

The second joint 622 extends from the second knuckle 320 and is connected to the other side of the first knuckle 310. The second joint 622 is disposed to be vertically spaced apart from the first joint 621 along a height direction of the vehicle. The second joint 622 functions as a lower reference point of the kingpin shaft, which becomes a central axis on which the wheel 2 rotates during a steering operation of the wheel 2. Accordingly, when the first knuckle 310 is rotated by the steering force transmitted from the first joint 621, the second joint 622 may induce so that the lower side of the first knuckle 310 is rotated while maintaining the kingpin shaft.

Figure 8:
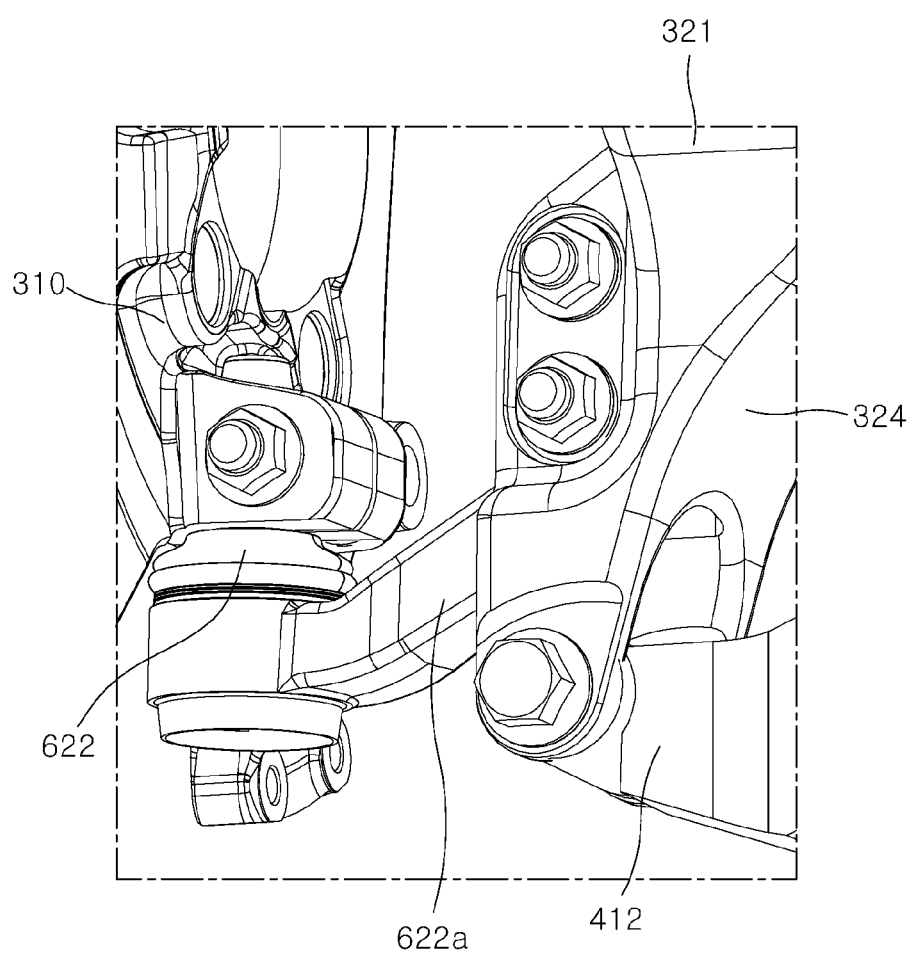
FIG. 8 is an enlarged view schematically illustrating a configuration of a second joint according to the first embodiment of the present disclosure.

FIG. 8 is an enlarged view schematically illustrating a configuration of a second joint according to first embodiment of the present disclosure.

Referring to FIGS. 1 to 8, the second joint 622 according to the present disclosure may be connected to a lower end of the second knuckle 320 and supported by being combined to an end of the extension arm 622a extending toward the first knuckle 310. The second joint 622 is vertically spaced apart from the first joint 621 along the height direction of the vehicle and is connected to the lower side of the first knuckle 310. Like the first joint 621, the second joint 622 may be exemplified as various types of constant velocity joints.

The first joint 621 and the second joint 622 are disposed to be inclined at a predetermined angle with respect to the ground so that the kingpin shaft may achieve a kingpin inclination angle of a certain size.

Figure 9:
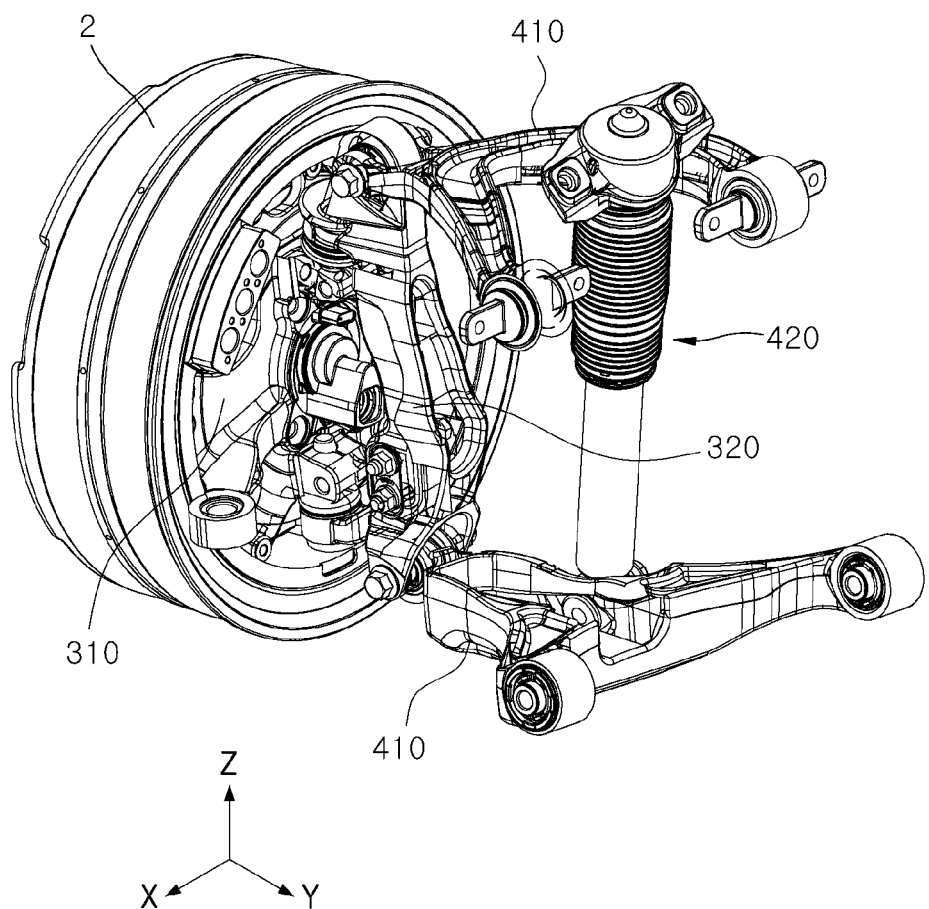
FIG. 9 is a perspective view schematically illustrating a configuration of a corner module apparatus for a vehicle according to a second embodiment of the present disclosure.
Figure 10:
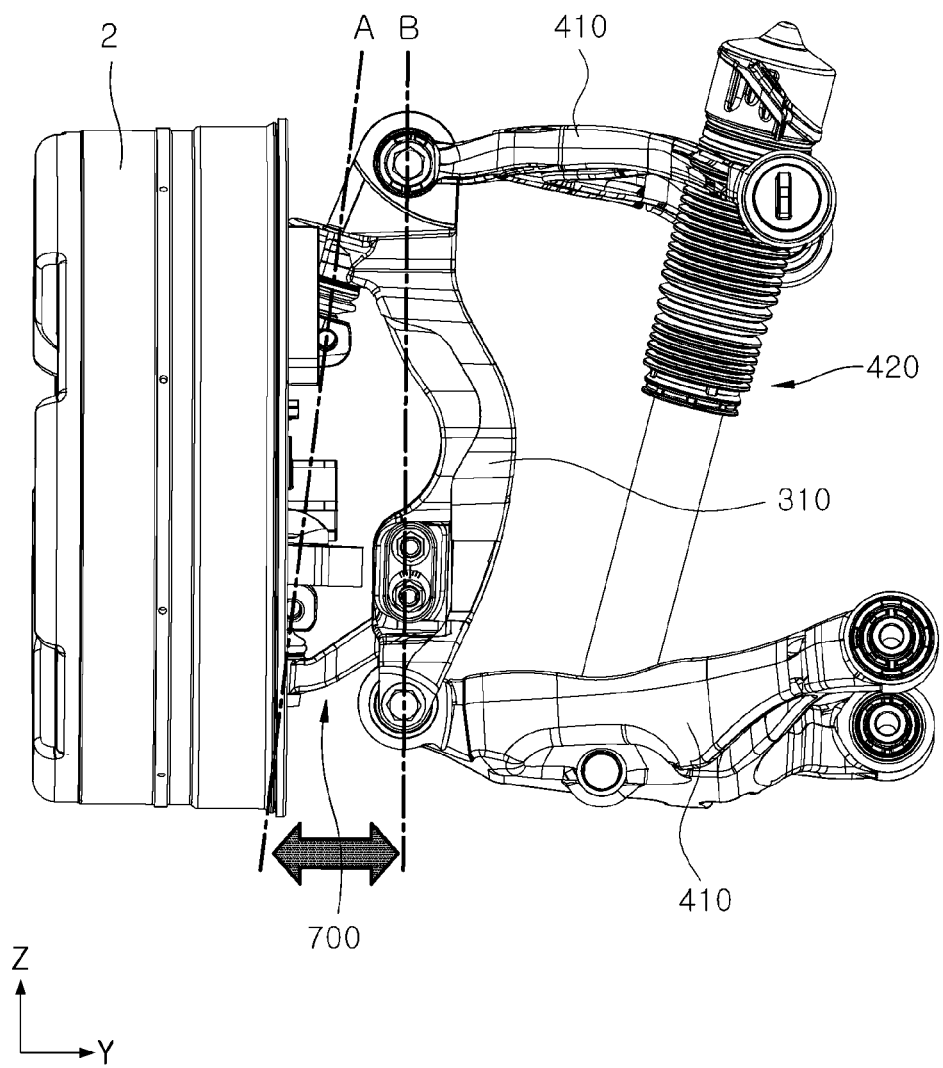
FIG. 10 is a front view schematically illustrating a configuration of the corner module apparatus for a vehicle according to the second embodiment of the present disclosure.
Figure 11:
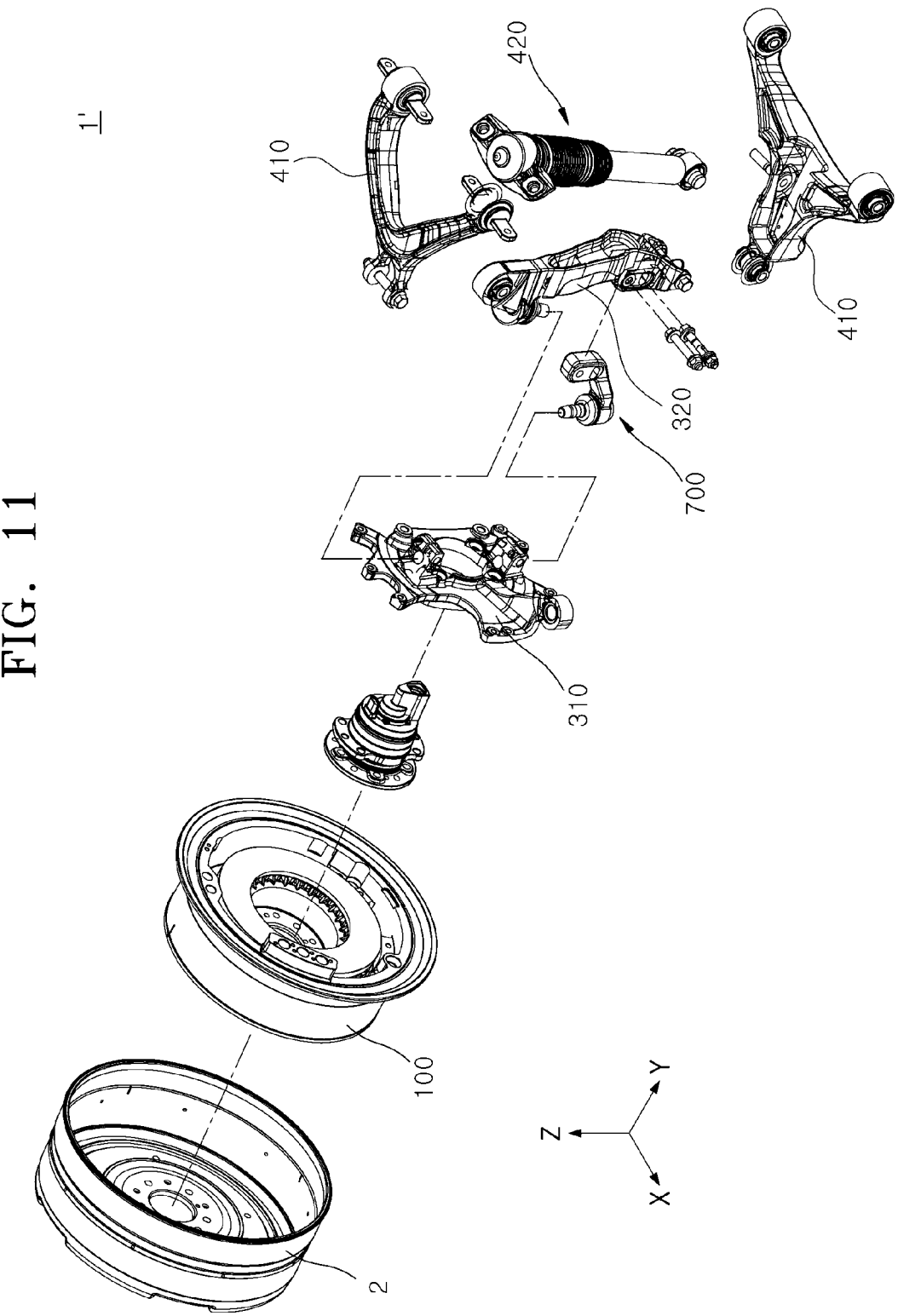
FIG. 11 is an exploded perspective view schematically illustrating a configuration of the corner module apparatus for a vehicle according to the second embodiment of the present disclosure.
Figure 12:
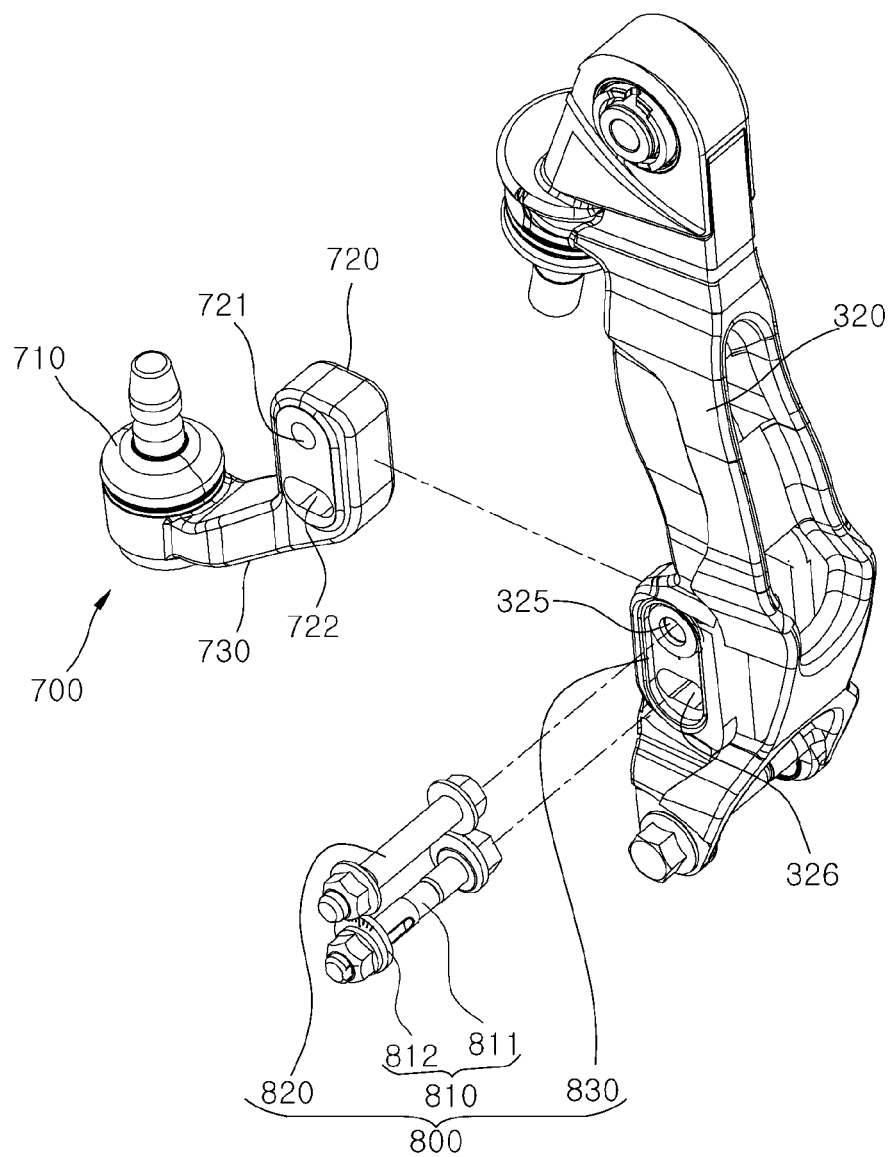
FIG. 12 is an exploded perspective view illustrating an angle adjustment unit in the corner module apparatus for a vehicle according to the second embodiment of the present disclosure.

FIG. 9 is a perspective view schematically illustrating a configuration of a corner module apparatus for a vehicle according to a second embodiment of the present disclosure, FIG. 10 is a front view schematically illustrating a configuration of the corner module apparatus for a vehicle according to the second embodiment of the present disclosure, FIG. 11 is an exploded perspective view schematically illustrating a configuration of the corner module apparatus for a vehicle according to the second embodiment of the present disclosure, and FIG. 12 is an exploded perspective view illustrating an angle adjustment unit in the corner module apparatus for a vehicle according to the second embodiment of the present disclosure.

Referring to FIGS. 9 to 12, a corner module apparatus 1 for a vehicle according to the present embodiment is configured to include a driving unit 100, a first knuckle 310, a second knuckle 320, a suspension arm 410, a joint arm 700, and an angle adjustment unit 800, which are described in detail as follows.

The driving unit 100 is installed inside the wheel 2 of the vehicle, and rotates the wheel 2 by providing a driving force to the wheel 2. The driving unit 100 is installed in each of the wheels 2 of the vehicle to provide driving force to a plurality of wheels 2 individually. The driving unit 100 according to the present embodiment may include a stator, fixed inside the wheel 2, which forms a magnetic field by receiving power from a vehicle battery, a rotor, installed rotatably inside the wheel 2, which rotates the wheel 2 by electromagnetic interaction with the stator. The stator and the rotor may be disposed such that the central axis thereof is positioned on the same line as the central axis of the wheel 2, and may be concentrically stacked on top of each other on the inside of the wheel 2.

The first knuckle 310 is coupled to the driving unit 100, transfers the steering force to the wheel 2, and rotates about the second knuckle 320 described below. More specifically, the first knuckle 310 provides a mechanical connection to the driving unit 100 and functions as a constituent element that constituents a kingpin axis A, the central axis of steering, during an operation of steering the wheel 2.

The first knuckle 310 may be rotated by receiving the steering force generated from a steering actuator (not illustrated) or a steering wheel (not illustrated) from a tie rod (not illustrated). The first knuckle 310 according to the present embodiment may be coupled to and supported by a stator of the driving unit 100 using a bolt or the like. The first knuckle 310 may rotatably support the rotor of the driving unit 100 with a wheel bearing or the like in between. The first knuckle 310 may be manufactured by casting a metal-based material in a mold or the like to ensure sufficient rigidity.

Each of both upper and lower ends of the first knuckle 310 are rotatably supported by the second knuckle 320 described below. Both ends of the first knuckle 310 are disposed to be inclined by a predetermined angle with respect to a Z-axis perpendicular to the ground. In this case, an angle by which both ends of the first knuckle 310 are inclined is set to be the same as an inclination angle of the kingpin axis A, the central axis for steering.

A specific shape of the first knuckle 310 is not limited to the shape illustrated in FIGS. 9 and 10, and various design changes may be made within the technical idea of a shape that may be coupled to the driving unit 100 and disposed to face an inner surface of the wheel 2.

The second knuckle 320 is disposed to face the first knuckle 310 and rotatably supports the first knuckle 310. The second knuckle 320 functions as a constituent element that constituent a suspension axis B that guides a bump and rebound behavior of the wheel 2 by providing a mechanical connection to the wheel 2 of a suspension arm 410 described below.

Herein, a suspension axis B may be exemplified as an axis disposed parallel to a Z axis in FIGS. 9 and 10.

The second knuckle 320 is disposed to face the first knuckle 310 in the width direction of the vehicle. An upper end portion of the second knuckle 320 is connected to an upper end portion of the first knuckle 310 with a ball joint in between, and a lower end portion of the second knuckle 320 is connected to a lower end portion of the first knuckle 310 with a joint arm 700 described below in between.

Accordingly, the suspension axis B formed in the second knuckle 320 and the kingpin axis A formed in the first knuckle 310 are separated from each other in the width direction of the vehicle, so that the kingpin axis A may be placed closer to the wheel 2. Thus, a kingpin offset value may be reduced, and the driving and braking stability of the vehicle may be improved.

A second fastening hole 325 corresponding to a first fastening hole 721 formed in a joint arm 700 described below is formed in the second knuckle 320 in a manner that passes through an outer surface of the lower end portion of the second knuckle 320. A second slot hole 326 corresponding to a first slot hole 722 formed in the joint arm 700 in a manner that passes through the outer surface of the second knuckle 320. In this case, the second slot hole 326 is formed in the shape of a longitudinal hole along the width direction of the vehicle.

A guide unit 830 for guiding a washer 812 is formed on the outer surface of the second knuckle 320 so that a cam bolt 810 of the angle adjustment unit 800 described below rotates eccentrically. The guide unit 830 is formed in the shape of a concavely recessing a portion of arm A in which the second fastening hole 325 and the second slot hole 326 are formed. That is, the second fastening hole 325 and the second slot hole 326 are formed inside the guide unit 830 in a shape that surrounds the circumference of the second fastening hole 325 and the second slot hole 326.

The specific shape of the second knuckle 320 is not limited to the shape illustrated in FIGS. 9 and 10, and various design changes may be made within the technical idea of a shape disposed to face the first knuckle 310 and rotatably support the first knuckle 310.

The suspension arm 410 extends from a vehicle body and absorbs shock or vibration applied to the wheel 2 from a road surface. More specifically, the suspension arm 410 supports the second knuckle 320 with respect to the vehicle body, and at the same time, absorbs the load applied from the wheel 2 due to the rigidity of the suspension arm 410 during vehicle driving and controls movement of the wheel 2 when the wheel 2 bumps and rebounds.

The suspension arm 410 is installed between the second knuckle 320 and the vehicle body. One end of the suspension arm 410 is rotatably connected to the vehicle body, and the other end thereof is disposed to face the second knuckle 320. Herein, the vehicle body may be exemplified as a chassis frame such as a subframe (not illustrated) installed on a lower portion of the vehicle.

The other end portion of the suspension arm 410 rotatably supports the second knuckle 320 with a separate connection member (not illustrated) in between. The suspension arms 410 are provided in a pair and are disposed to face each other while being spaced away from each other in the vertical direction.

The other end portions of the pair of suspension arms 410 are connected to the upper and lower end portions of the second knuckle 320, respectively. The pair of suspension arms 410 may be formed to have the shape of a double wishbone. Accordingly, the suspension arm 410 may set a negative camber of the wheel 2, thereby improving cornering performance of the vehicle and performing low-floor setting to lower a vehicle height.

A shock absorber 420 is provided an expandable and contractable manner along the lengthwise direction thereof to absorb shock or vibration transferred from the road surface to the vehicle body through the wheel 2.

The joint arm 700 connects the lower end portion of the first knuckle 310 and the lower end portion of the second knuckle 320 to each other. The joint arm 700 may include a ball joint 710, a fastener 720, and a connection member 730. The connection member 730 connects the ball joint 710 and the fastener 720 to each other.

The ball joint 710 is joint-coupled to the lower end portion of the first knuckle 310 so that the first knuckle 310 may be rotatable.

The fastener 720 is fastened to the second knuckle 320 in a state of being accommodated inward from the lower end portion of the second knuckle 320.

The first fastening hole 721 is formed in an upper portion of the fastener 720 in a manner that passes through an outer surface of the fastener 720. The first slot hole 722 is formed in an lower portion of the fastener 720 in a manner that passes through the outer surface of the fastener 720. In this case, the first slot hole 722 is formed in the shape of a longitudinal hole along the width direction of the vehicle.

The angle adjustment unit 800 is provided between the second knuckle 320 and the joint arm 700. The angle adjustment unit 800 adjusts a relative angle between the first knuckle 310 and the second knuckle 320 by axially rotating the joint arm 700 in the width direction of the vehicle.

The angle adjustment unit 800 may be configured to include the cam bolt 810 and an adjustment member 820.

The washer 812 is eccentrically coupled to an outer circumferential surface of a bolt shaft 811 of the cam bolt 810. The bolt shaft 811 passes through the first slot hole 722 and the second slot hole 326 in the cam bolt 810.

The adjustment member 820 is a bolt. The adjustment member 820 passes through the first fastening hole 721 and the second fastening hole 325 and fastens the second knuckle 320 and the fastener 720 to each other.

A process of operating the corner module apparatus for a vehicle according to the present embodiment, configured as described, will be described below.

Figure 13:
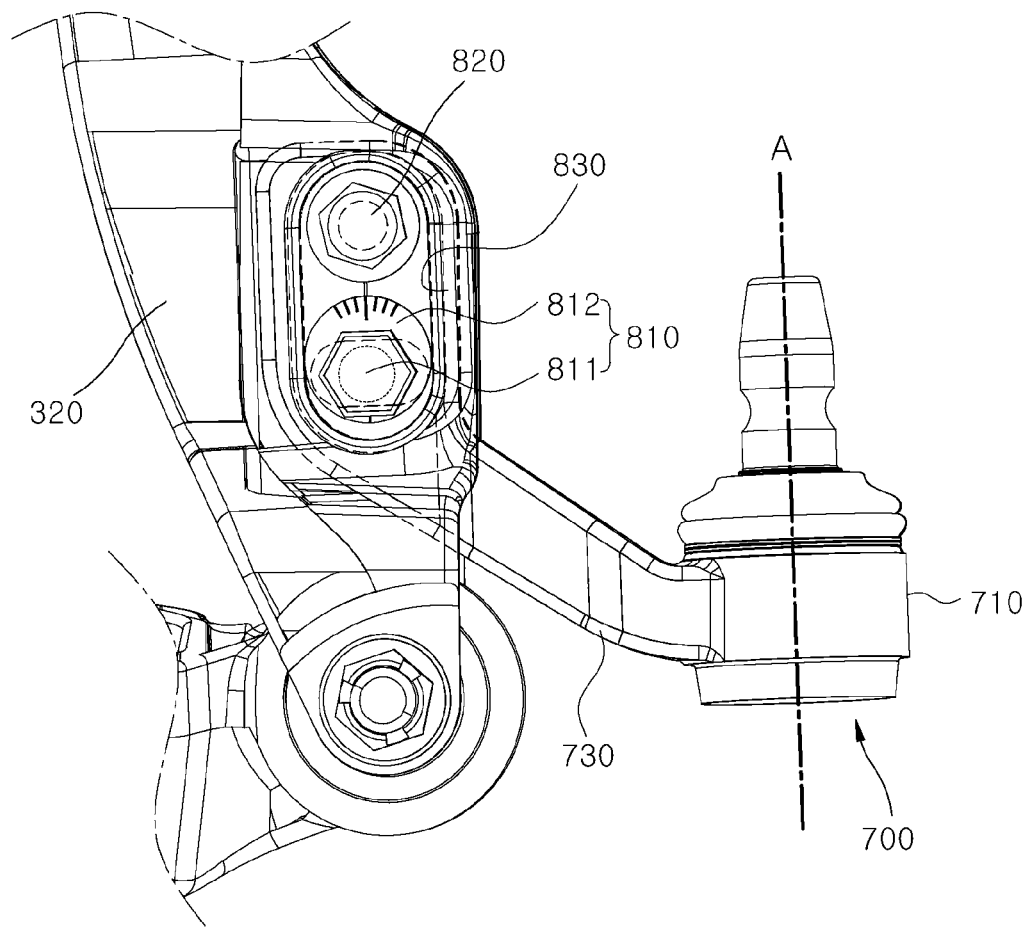
FIG. 13 is a view illustrating a state where the corner module apparatus for a vehicle according to the second embodiment of the present disclosure is operated for zero camber setting.

FIG. 13 is a view illustrating a state where the corner module apparatus for a vehicle according to the second embodiment of the present disclosure is operated for zero camber setting. Referring to FIGS. 9, 10, 12, and 13, when the fastener 720 of the joint arm 700 is accommodated inward from the lower end portion of the second knuckle 320, the adjustment member 820 passes through the first fastening hole 721 and the second fastening hole 325, and a nut is spirally coupled to a free end portion of the adjustment member 820.

The cam bolt 810 in which the washer 812 is eccentrically coupled to the bolt shaft 811 passes through the first slot hole 722 and the second slot hole 326, and the nut is spirally coupled to a free end portion of the cam bolt 810. In this case, a predetermined relative angle is maintained between the kingpin axis A and the suspension axis B.

Figure 14:
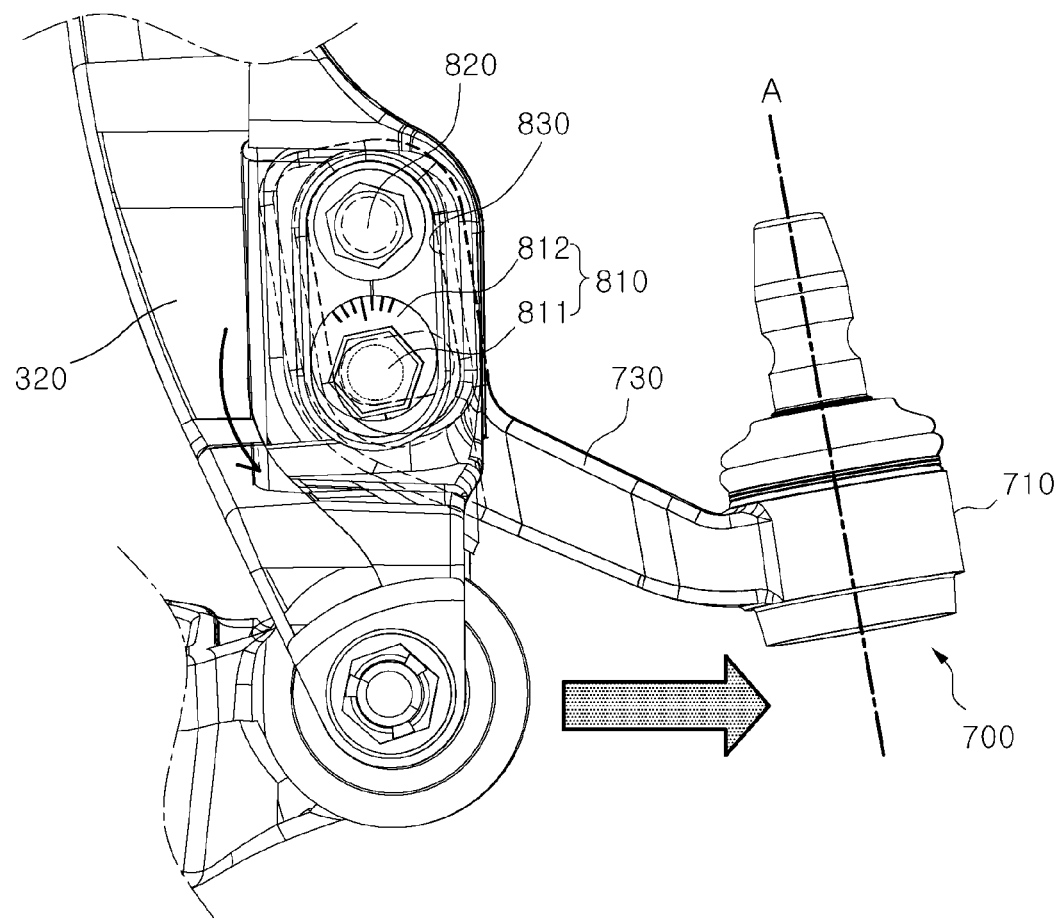
FIG. 14 is a view illustrating a state where the corner module apparatus for a vehicle according to the second embodiment of the present disclosure is operated for negative camber setting.

FIG. 14 is a view illustrating a state where the corner module apparatus for a vehicle according to the second embodiment of the present disclosure is operated for negative camber setting. Referring to FIGS. 9, 10, 12, and 14, when the cam bolt 810 is rotated in one (counterclockwise) direction while a rotating tool is coupled to a head of the cam bolt 810, the cam bolt 810 is eccentrically rotated by the guide unit 830 surrounding the outer circumference of the washer 812 eccentrically coupled to the bolt shaft 811. At the same time, the joint arm 700 is rotated about the adjustment member 820 from inward to outward in the width direction of the vehicle.

That is, in a state where the suspension axis B is fixed, the inclination angle of the kingpin axis A is adjusted, and thus, a camber angle may also be adjusted. Accordingly, wheel alignments of the kingpin axis A and the suspension axis B may be individually adjusted.

Figure 15:
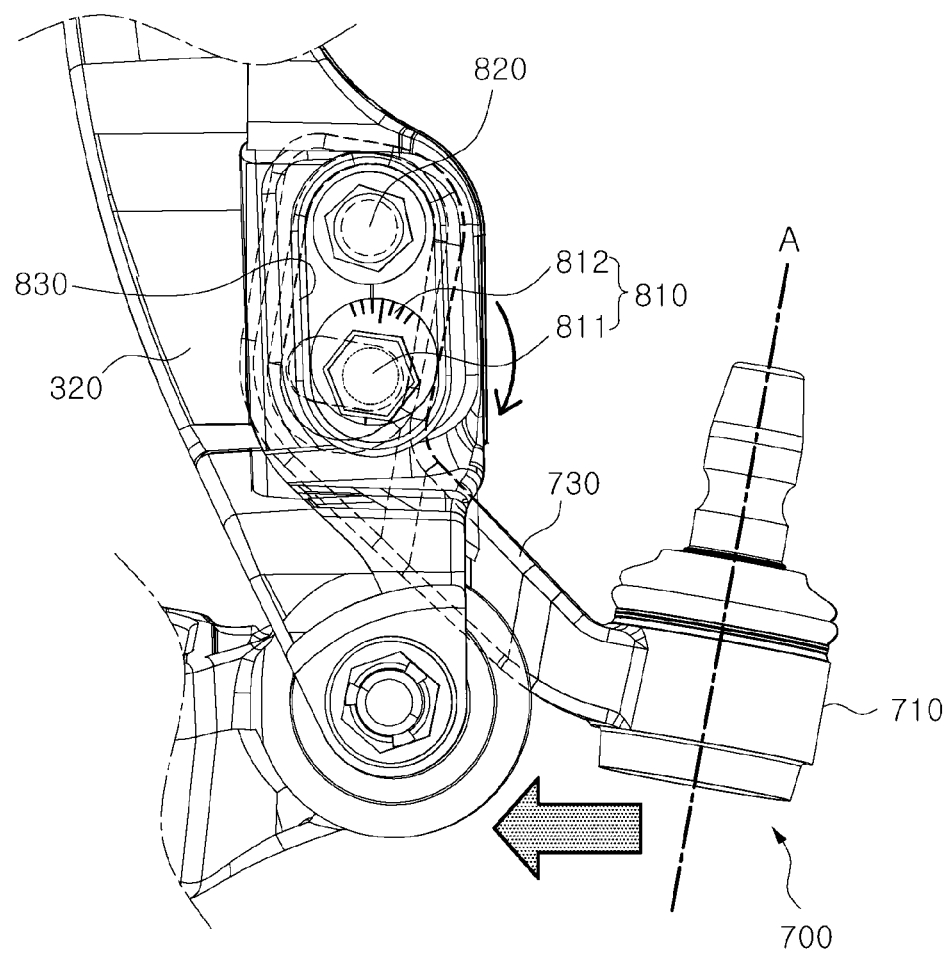
FIG. 15 is a view illustrating a state where the corner module apparatus for a vehicle according to the second embodiment of the present disclosure is operated for positive camber setting.

FIG. 15 is a view illustrating a state where the corner module apparatus for a vehicle according to the second embodiment of the present disclosure is operated for positive camber setting. Referring to FIGS. 9, 10, 12, and 15, when the cam bolt 810 is rotated in the opposite (clockwise) direction while the rotating tool is coupled to the head portion of the cam bolt 810, the cam bolt 810 is eccentrically rotated by the guide unit 830 surrounding the outer circumference of the washer 812 eccentrically coupled to the bolt shaft 811. At the same time, the joint arm 700 is rotated about the adjustment member 820 from outward to inward in the width direction of the vehicle.

That is, in a state where the suspension axis B is fixed, the inclination angle of the kingpin axis A is adjusted, and thus, the camber angle may also be adjusted. Accordingly, the wheel alignments of the kingpin axis A and the suspension axis B may be individually adjusted.

The corner module apparatus for a vehicle according to an embodiment of the present disclosure may adjust the inclination angle of the kingpin axis A by axially rotating the joint arm 700 connecting the lower end portion of the first knuckle 310 and the lower end portion of the second knuckle 320 to each other. Thus, the wheel alignments of the kingpin axis A and the suspension axis B may be individually adjusted.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A corner module apparatus for a vehicle, comprising:
   a driving unit installed inside a wheel, the driving unit being configured to provide a driving force to the wheel;
   a first knuckle coupled to the driving unit;
   a second knuckle spaced apart from the first knuckle in a width direction of the vehicle and disposed to face each other;
   a suspension unit configured to connect to the second knuckle and to support the second knuckle for a vehicle body;
   a steering driving unit installed in the second knuckle configured to generate a steering force;
   a steering angle adjustment unit connected to the first knuckle, the steering angle adjustment unit being configured to adjust a steering angle of the wheel in conjunction with the steering force generated from the steering driving unit,
   wherein the second knuckle comprises:
      a knuckle body disposed to face the first knuckle and provided with an accommodation unit into which the steering driving unit is inserted;
      a mounting unit which extends from a first side of the knuckle body, the mounting unit being configured to support the steering angle adjustment unit;
      a first connection unit extending from the mounting unit and connected to the suspension unit; and
      a second connection unit extending from a second side of the knuckle body and connected to the suspension unit, and
   wherein the first connection unit and the second connection unit are disposed to be spaced apart from each other in a direction perpendicular to a ground.

2. The corner module apparatus of claim 1, wherein the knuckle body is disposed to be inclined with respect to a ground.

3. The corner module apparatus of claim 1, wherein the accommodation unit penetrates the knuckle body in a width direction of the vehicle.

4. The corner module apparatus of claim 1, wherein the suspension unit comprises:
   a suspension arm provided between the second knuckle and the vehicle body and being configured to support the second knuckle; and
   a shock absorber connected to the suspension arm, the shock absorber configured to absorb an impact transmitted from a road surface.

5. The corner module apparatus of claim 4, wherein the suspension arm comprises:
   a first arm comprising a first end rotatably connected to the first connection unit and a second end rotatably connected to the vehicle body; and
   a second arm, the second arm being spaced apart from the first arm, the second arm comprising:
      a third end rotatably connected to the second connection unit; and
      a fourth rotatably connected to the vehicle body.

6. A corner module apparatus for a vehicle, comprising:
   a driving unit installed inside a wheel, the driving unit being configured to provide a driving force to the wheel;
   a first knuckle coupled to the driving unit;
   a second knuckle spaced apart from the first knuckle in a width direction of the vehicle and disposed to face each other;
   a suspension unit configured to connect to the second knuckle and to support the second knuckle for a vehicle body;
   a steering driving unit installed in the second knuckle configured to generate a steering force; and
   a steering angle adjustment unit connected to the first knuckle, the steering angle adjustment unit being configured to adjust a steering angle of the wheel in conjunction with the steering force generated from the steering driving unit,
   wherein the steering angle adjustment unit comprises:
      a deceleration unit configured to connect with the second knuckle and to slow down the steering force generated from the steering driving unit; and
      a joint unit configured to vary the steering angle of the wheel by transmitting the steering force from the deceleration unit to the first knuckle.

7. The corner module apparatus of claim 6, wherein the deceleration unit comprises:
   a first transmission gear configured to rotate with an input shaft of the steering driving unit;
   a second transmission gear that is configured to engage with the first transmission gear and to rotate in conjunction with a rotation of the first transmission gear; and
   a third transmission gear configured to engage with the second transmission gear and to rotate an output shaft in conjunction with a rotation of the second transmission gear.

8. The corner module apparatus of claim 7, wherein the first transmission gear comprises:
   a shape of a worm shaft; and worm threads provided on an outer peripheral surface of the first transmission gear.

9. The corner module apparatus of claim 7, wherein the joint unit comprises:
- a first joint extending from the output shaft and connected to a first side of the first knuckle; and
- a second joint extending from the second knuckle, spaced apart from the first joint, and connected to a second side of the first knuckle.

10. The corner module apparatus of claim 9, wherein the first joint and the second joint are disposed to be inclined at a predetermined angle with respect to a ground.

11. The corner module apparatus of claim 9, wherein the first joint and the second joint comprise constant velocity joints.

12. A corner module apparatus for a vehicle, comprising:
- a driving unit installed inside a wheel, the driving unit being configured to provide a driving force to the wheel;
- a first knuckle coupled to the driving unit;
- a second knuckle spaced away from the first knuckle to face the first knuckle in a width direction of the vehicle and being configured to rotatably support the first knuckle;
- a suspension arm configured to connect the second knuckle and a vehicle body and configured to support the second knuckle with respect to the vehicle body;
- a joint arm configured to connect the first knuckle and the second knuckle to each other;
- an angle adjustment unit provided between the second knuckle and the joint arm and configured to adjust a relative angle between the first knuckle and the second knuckle by axially rotating the joint arm in the width direction of the vehicle;
- a ball joint rotatably jointed to the first knuckle;
- a fastener fastened to the second knuckle; and
- a connection member configured to connect, the connection member being provided between the ball joint and the fastener.

13. The corner module apparatus of claim 12, wherein a first fastening hole is defined in the joint arm, the first fastening hole passing through an outer surface of the fastener, and
wherein a first slot hole is defined in the joint arm, the first slot hole being positioned under the first fastening hole and passing through the outer surface of the fastener.

14. The corner module apparatus of claim 13, wherein a second fastening hole is defined in the second knuckle, the second fastening hole corresponding to the first fastening hole, and
wherein a second slot hole is defined in the second knuckle, the second slot hole corresponding to the first slot hole.

15. The corner module apparatus of claim 14, wherein the first slot hole and the second slot hole are formed in a shape of a longitudinal hole in the width direction of the vehicle.

16. The corner module apparatus of claim 14, wherein the angle adjustment unit comprises:
- a cam bolt;
- a washer being eccentrically coupled to an outer circumferential surface of a bolt shaft of the cam bolt, wherein the first slot hole and the second slot hole pass through the bolt shaft; and
- a guide unit formed on an outer surface of the second knuckle, the guide unit being configured to guide the washer in such a manner as to eccentrically rotate the cam bolt.

17. The corner module apparatus of claim 16, wherein the angle adjustment unit further comprises an adjustment member passing through the first fastening hole and the second fastening hole, the adjustment member being configured to fasten the second knuckle and the fastener to each other.

* * * * *